No. 774,026. Patented November 1, 1904.

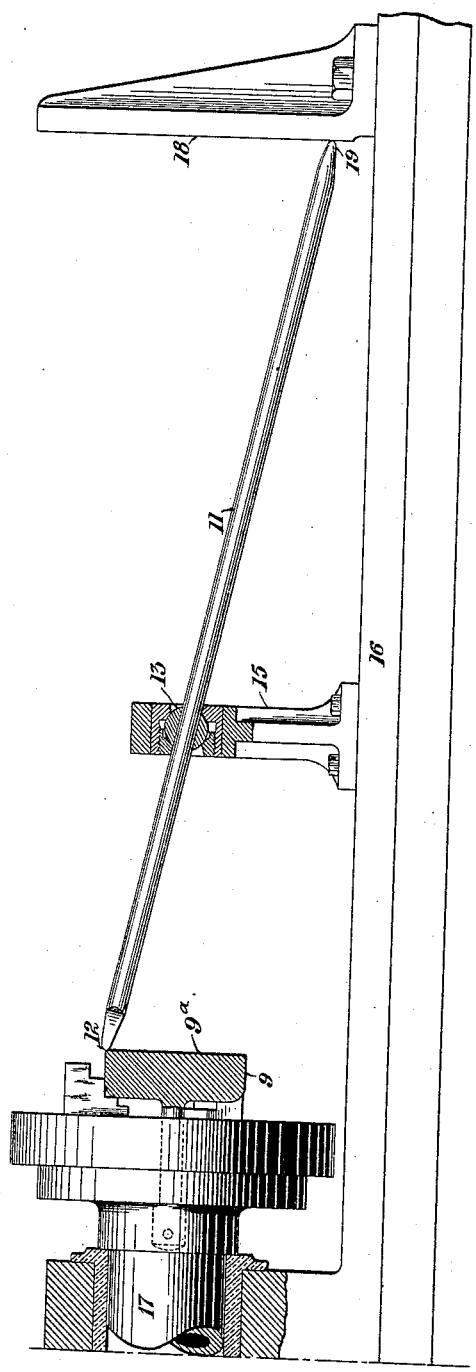

UNITED STATES PATENT OFFICE.

MARK BARR, OF LONDON, ENGLAND, ASSIGNOR TO THE LINOTYPE COMPANY, LIMITED, OF LONDON, ENGLAND.

APPARATUS FOR TURNING CURVED SURFACES OF PREDETERMINED NON-CIRCULAR SECTION.

SPECIFICATION forming part of Letters Patent No. 774,026, dated November 1, 1904.

Application filed July 26, 1900. Serial No. 24,920. (No model.)

*To all whom it may concern:*

Be it known that I, MARK BARR, residing at London, England, have invented certain new and useful Improvements in Apparatus for Turning Curved Surfaces of Predetermined Non-Circular Section; and I do hereby declare the following to be a full, clear, and exact description of the invention, such as will enable others skilled in the art to which it appertains to make and use the same.

For certain purposes it is necessary to provide a surface, being a figure of revolution, which shall be approximately spherical and known form and which at no section along any meridian will present a contour having a circular arc. As an example of such a necessity, there is now instanced the three-dimension engraving-machine described in the specification of the United States Letters Patent No. 736,475. In that machine there is employed a tracer-rod capable of sliding longitudinally through a universal fulcrum-joint and carrying at its lower end a tracer held down upon the pattern by a concave contact-surface which bears constantly upon the upper end of the said tracer-rod, this contact-surface serving to transmit to the engraving-tools the vertical motion derived from the ascent and descent of the tracer in or on the pattern and to eliminate or neutralize the vertical motion, which but for the particular form of this contact-surface would be transmitted to the engraving-tools when the tracer-point is moved in a given horizontal plane. Owing to the fact that the tracer-point must be kept down upon the practically plane surface of the pattern the upper end of the tracer-rod swings in curved paths which are of only approximately circular arcual form, the two ends of each such path dipping down from an actually circular arc. The upper end of the tracer-rod therefore moves in a path approximating in shape to part of a sphere, but at no section of which, along any meridian thereof, is there presented a contour having a circular arc. In order, therefore, to effect the above-named elimination or neutralization, the contact-surface must have the above-mentioned particular shape, and it is the object of this invention to provide means by which such a surface and other surfaces of kindred form or having kindred properties can be easily and accurately produced.

The invention will now be described by reference to the accompanying drawing which as an example represents the apparatus adapted to produce the concave contact-surface of the before-mentioned engraving-machine. This drawing is to be taken as part of this specification and read therewith and is a front sectional elevation of the said apparatus.

In the drawing, 9 indicates the block or body in which the contact-surface is to be formed. This block after it has been duly machined with the exception of that surface is chucked in a lathe in the ordinary way with the face $9^a$, in which that surface is to be cut, outward. A roll 11, carrying a suitable cutter 12 at one end and being then of the same length from end to end as the before-mentioned tracer-rod, is mounted on the lathe by having an equivalent 13 of the before-mentioned fulcrum-joint mounted in a standard 15, which is clamped to the lathe-bed 16 at the same distance from the block 9 as the ultimate fulcrum-joint is to be from the finished block in the engraving-machine, the axis of the said equivalent 13 being alined with or intersecting the axis of the lathe-mandrel 17. The rod 11 is capable of sliding longitudinally through the fulcrum 13 in the same manner as is the tracer-rod capable of sliding through its fulcrum-joint in the engraving-machine.

A vertical plate 18 is clamped to the lathe-bed 16 in the proper relative position to stand for the top plane of the pattern. As the outer face $9^a$ of the block 9 is still uncut, the cutter-rod 11 is now standing obliquely between it and the vertical plate 18, the cutter 12 on one end of the rod 11 being next to an edge of the said outer face on one side of the axis of the lathe and the opposite end of the rod 11 (which end is the equivalent of the before-mentioned tracer-point) at a point on the plate 18 diametrically opposite to the point at which is situated the end of the cutter 12 on the block 9, all as indicated in the drawing. The lathe is then started and the cutter-rod moved, so as to take the end 19 radially over the surface of the plate 18—that is to say, in a plane containing the lathe-axis. When the rod 11 has completed this motion, the block 9 will have been turned out concave to the particular curve which corresponds with the path followed by the upper or non-tracing end of the tracer-rod when the tracing-point is moved about and constantly in touch with a given plane surface of the pattern.

I claim—

1. In apparatus for turning curved surfaces of predetermined non-circular arcual section the combination with the mandrel or spindle of a lathe adapted to rotate the body on which such a surface is to be formed, of a rod, a cutter at one end of the rod arranged to contact with the rotating body, a stationary plate with which the other end of the rod is in contact, and a fulcrum for the rod intermediate its two ends, through which the said rod is capable of sliding longitudinally.

2. In apparatus for turning curved surfaces of predetermined non-circular arcual section, the combination with the mandrel or spindle of a lathe adapted to rotate the body on which such a surface is to be formed, of a rod, a cutter at one end of the rod arranged to contact with the rotating body, a stationary flat plate perpendicular to the axis of the lathe-mandrel and with which the other end of the rod is in contact, and a fulcrum for the rod intermediate its two ends, through which the said rod is capable of sliding longitudinally.

3. In apparatus for turning curved surfaces of predetermined non-circular arcual section, the combination with the mandrel or spindle of a lathe adapted to rotate the body on which such a surface is to be formed, of a rod, a cutter at one end of the rod arranged to contact with the rotating body, a stationary plate with which the other end of the rod is in contact, and a fulcrum for the rod intermediate its two ends, through which the said rod is capable of sliding longitudinally and the axis of which intersects the axis of the lathe-mandrel.

In testimony that I claim the foregoing as my invention I have signed my name in presence of two subscribing witnesses.

MARK BARR.

Witnesses:
   CHAS. S. WOODROFFE,
   ROBERT E. McLAREN.